United States Patent
Oesterling et al.

(10) Patent No.: US 8,751,241 B2
(45) Date of Patent: Jun. 10, 2014

(54) METHOD AND SYSTEM FOR ENABLING A DEVICE FUNCTION OF A VEHICLE

(75) Inventors: Christopher L. Oesterling, Troy, MI (US); William E. Mazzara, Jr., Drayton Plains, MI (US); Jeffrey M. Stefan, Clawson, MI (US)

(73) Assignee: General Motors LLC, Detroit, MI (US)

( * ) Notice: Subject to any disclaimer, the term of this patent is extended or adjusted under 35 U.S.C. 154(b) by 974 days.

(21) Appl. No.: 12/100,696

(22) Filed: Apr. 10, 2008

(65) Prior Publication Data

US 2008/0215336 A1 Sep. 4, 2008

Related U.S. Application Data (63) Continuation of application No. 10/738,460, filed on Dec. 17, 2003, now abandoned.

(51) Int. Cl.
| | | |
|---|---|---|
| *G10L 25/00* | (2013.01) | |
| *G10L 21/00* | (2013.01) | |
| *G10L 15/00* | (2013.01) | |
| *G05D 1/00* | (2006.01) | |
| *G06F 7/00* | (2006.01) | |
| *H04M 1/64* | (2006.01) | |
| *H04M 3/42* | (2006.01) | |
| *H04M 3/00* | (2006.01) | |

(52) U.S. Cl.
USPC ........... 704/275; 704/231; 704/246; 704/247; 704/251; 704/270; 701/1; 701/36; 701/49; 701/51; 701/53; 701/2; 701/3; 701/19; 701/21; 701/22; 701/23; 701/400; 455/403; 455/414.1; 455/414.2; 455/414.3; 455/414.4; 455/418; 455/419; 455/420; 379/88.01

(58) Field of Classification Search
CPC ....... G10L 15/265; G10L 15/22; G10L 15/00; G10L 15/04; G10L 15/08; G10L 15/18; G10L 15/19; G10L 15/1815; H04W 4/02; H04W 8/18; H04W 4/00; H04M 3/4936; H04M 1/271; H04M 2201/40; G06F 3/16; G01C 21/3605; G01C 21/3608; B60R 16/0373
USPC ......... 704/231, 246, 247, 251, 252, 275, 270; 701/1, 36, 49, 50, 51, 53, 2, 3, 19, 21, 701/22, 23
See application file for complete search history.

(56) References Cited

U.S. PATENT DOCUMENTS 6,243,684 B1 * 6/2001 Stuart et al. .................... 704/275
6,505,161 B1 * 1/2003 Brems ........................... 704/270

(Continued)

FOREIGN PATENT DOCUMENTS

WO    WO 9957648 A1 * 11/1999

*Primary Examiner* — Paras D Shah
(74) *Attorney, Agent, or Firm* — Anthony Luke Simon; Reising Ethington P.C.

(57) ABSTRACT

The current invention provides a method and system for enabling a device function of a vehicle. A speech input stream is received at a telematics unit. A speech input context is determined for the received speech input stream. The received speech input stream is processed based on the determination and the device function of the vehicle is enabled responsive to the processed speech input stream. A vehicle device in control of the enabled device function of the vehicle is directed based on the processed speech input stream. A computer usable medium with suitable computer program code is employed for enabling a device function of a vehicle.

14 Claims, 5 Drawing Sheets

(56) References Cited

U.S. PATENT DOCUMENTS

| | | | |
|---|---|---|---|
| 6,539,358 B1* | 3/2003 | Coon et al. | 704/275 |
| 6,597,018 B2 | 7/2003 | Nei | |
| 6,598,018 B1* | 7/2003 | Junqua | 704/251 |
| 6,654,720 B1* | 11/2003 | Graham et al. | 704/270 |
| 6,693,517 B2 | 2/2004 | McCarthy et al. | |
| 6,732,077 B1 | 5/2004 | Gilbert et al. | |
| 6,792,349 B1* | 9/2004 | Chen et al. | 701/410 |
| 6,937,977 B2* | 8/2005 | Gerson | 704/201 |
| 6,996,397 B2* | 2/2006 | Fraser et al. | 455/426.1 |
| 7,003,463 B1 | 2/2006 | Maes et al. | 704/270.1 |
| 7,092,496 B1 | 8/2006 | Maes et al. | 379/88.01 |
| 7,113,572 B2 | 9/2006 | Holmes | 379/88.14 |
| 7,401,023 B1* | 7/2008 | Schwartz et al. | 704/275 |
| 2002/0013706 A1* | 1/2002 | Profio | 704/254 |
| 2002/0049535 A1* | 4/2002 | Rigo et al. | 701/211 |
| 2002/0065663 A1* | 5/2002 | Thomas et al. | 704/275 |
| 2002/0098853 A1* | 7/2002 | Chrumka | 455/456 |
| 2002/0174360 A1* | 11/2002 | Ikeda | 713/200 |
| 2002/0193992 A1* | 12/2002 | Baker et al. | 704/249 |
| 2003/0061033 A1* | 3/2003 | Dishert | 704/201 |
| 2003/0069690 A1* | 4/2003 | Correia et al. | 701/211 |
| 2003/0093281 A1* | 5/2003 | Geilhufe et al. | 704/275 |
| 2003/0182132 A1* | 9/2003 | Niemoeller | 704/275 |
| 2003/0212562 A1* | 11/2003 | Patel et al. | 704/275 |
| 2004/0002866 A1* | 1/2004 | Deisher et al. | 704/275 |
| 2004/0102977 A1* | 5/2004 | Metzler et al. | 704/275 |
| 2004/0172256 A1* | 9/2004 | Yokoi et al. | 704/275 |
| 2004/0186819 A1* | 9/2004 | Baker | 707/1 |
| 2004/0267534 A1* | 12/2004 | Beiermeister et al. | 704/275 |
| 2005/0010417 A1* | 1/2005 | Holmes | 704/275 |
| 2005/0065779 A1 | 3/2005 | Odinak | |

* cited by examiner

FIG. 4

METHOD AND SYSTEM FOR ENABLING A DEVICE FUNCTION OF A VEHICLE

CROSS-REFERENCE TO RELATED APPLICATION

This application is a continuation of U.S. application Ser. No. 10/738,460, filed Dec. 17, 2003, which has been published as U.S. Patent Application Publication No. 2005/0137877 A1, the entire contents of which are hereby incorporated by reference.

FIELD OF THE INVENTION

This invention relates generally to telematics systems. In particular the invention relates to a method and system for enabling a device function of a vehicle.

BACKGROUND OF THE INVENTION

One of the fastest growing areas of communications technology is related to automobile network solutions. The demand and potential for wireless vehicle communication, networking and diagnostic services have recently increased. Although many vehicles on the road today have limited wireless communication functions, such as unlocking a door and setting or disabling a car alarm, new vehicles offer additional wireless communication systems that help personalize comfort settings, run maintenance and diagnostic functions, place telephone calls, access call-center information, update controller systems, determine vehicle location, assist in tracking vehicle after a theft of the vehicle and provide other vehicle-related services. Drivers can call telematics call centers and receive navigational, concierge, emergency, and location services, as well as other specialized help such as locating the geographical position of a stolen vehicle and honking the horn of a vehicle when the owner cannot locate it in a large parking garage. Telematics service providers can offer enhanced telematics services by supplying a subscriber with a digital handset.

With speech recognition available in today's vehicles a driver can control devices within the vehicle without removing their hands from the steering wheel. Drivers receive various forms of information while operating a vehicle such as phone numbers or destination addresses. While a driver is on the road, it is not convenient for them to record the information and then input that information to a vehicle device such as an in-vehicle phone or navigation system. Information of interest to a driver can be a part of a conversation the driver has with another person and not in a format directly usable by a vehicle device.

The driver can receive a business address as part of a conversation with a person at the business. To use that address with the vehicles navigation system, the driver must remember or record the address, enable the navigation system and input the address to the navigation system. This requirement is both an inconvenience for the driver and a limitation that decreases the driver's satisfaction with the capabilities of the navigation system.

It is desirable therefore, to provide a method and system for enabling a device function of a vehicle, that overcomes the challenges and obstacles described above.

SUMMARY OF THE INVENTION

The current invention provides a method for enabling a device function of a vehicle. A speech input stream is received at a telematics unit. A speech input context is determined for the received speech input stream. The received speech input stream is processed based on the determination and the device function of the vehicle is enabled responsive to the processed speech input stream. The method further comprises directing a vehicle device in control of the device function based on the processed speech input stream.

Another aspect of the current invention provides a computer usable medium including computer program code for enabling a device function of a vehicle. The computer usable medium comprises: computer program code for receiving a speech input stream at a telematics unit; computer program code for determining a speech input context for the received speech input stream; computer program code for processing the received speech input stream based on the determination; and computer program code for enabling the device function of the vehicle responsive to the processed speech input stream. The computer usable medium further comprises computer program code for directing a vehicle device in control of the device function based on the processed speech input stream.

Another aspect of the current invention provides a system for enabling a device function of a vehicle. The system comprises: means for receiving a speech input stream at a telematics unit; means for determining a speech input context for the received speech input stream; means for processing the received speech input stream based on the determination; and means for enabling the device function of the vehicle responsive to the processed speech input stream. The system further comprises means for directing a vehicle device in control of the device function based on the processed speech input stream.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
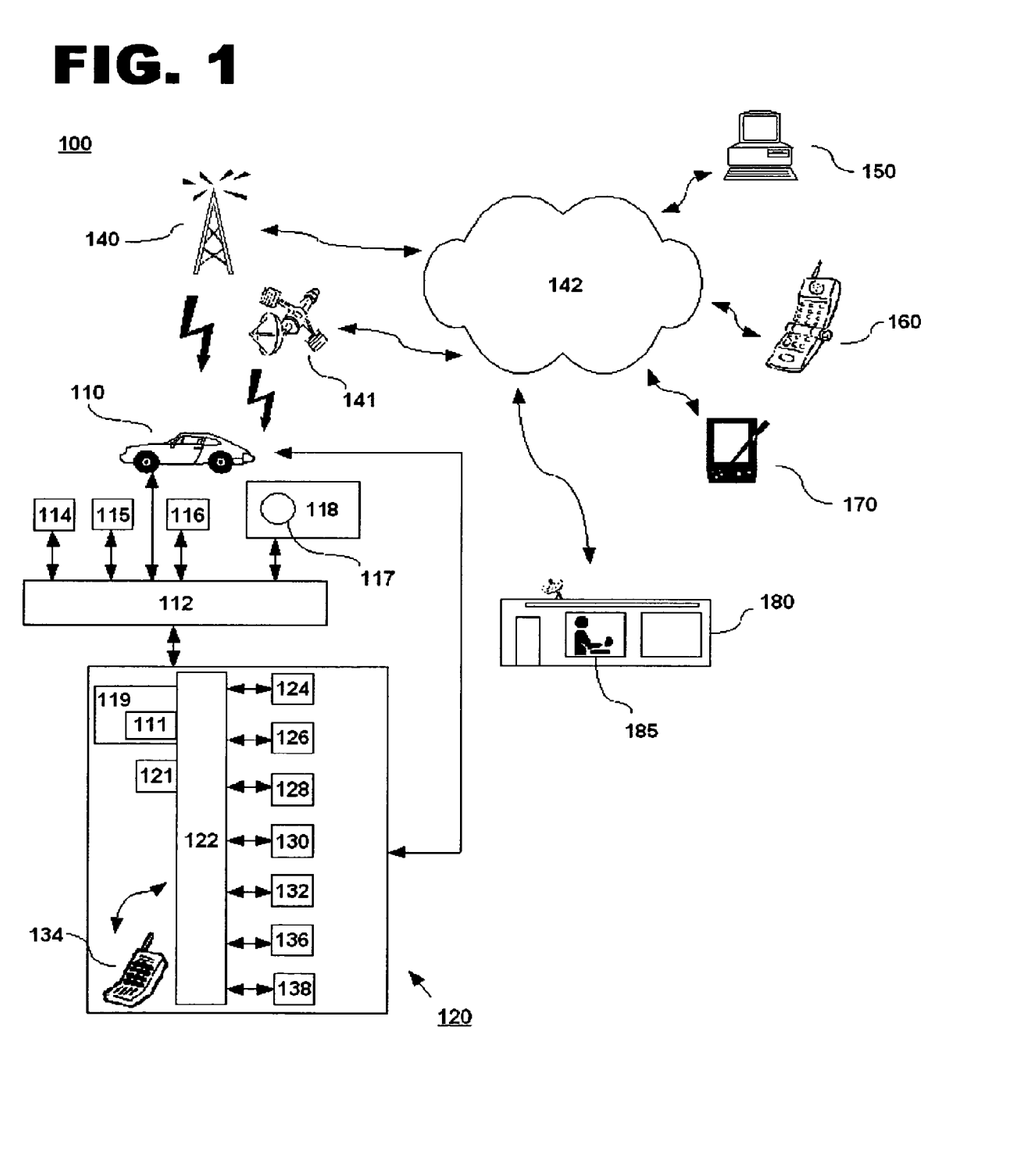
FIG. 1 is a schematic diagram of a system for enabling a device function of a vehicle in accordance with one embodiment of the current invention.

FIG. 1 is a schematic diagram of a system for enabling a device function of a vehicle in accordance with one embodiment of the current invention at 100. The system for enabling a device function of a vehicle at 100 comprises: a mobile vehicle 110, a telematics unit 120, one or more wireless carrier systems 140, or one or more satellite carrier systems 141, one or more communication networks 142, and one or more call centers 180. Mobile vehicle 110 is a vehicle such as a car or truck equipped with suitable hardware and software for transmitting and receiving speech and data communications. Vehicle 110 has a multimedia system 118 having one or more speakers 117.

In one embodiment of the invention, telematics unit comprises: a digital signal processor (DSP) 122 connected to a wireless modem 124; a global positioning system (GPS) receiver or GPS unit 126; an in-vehicle memory 128; a microphone 130; one or more speakers 132; an embedded or in-vehicle phone 134 or an email access appliance 136; and a display 138. DSP 122 is also referred to as a microcontroller, controller, host processor, ASIC, or vehicle communications processor. GPS unit 126 provides longitude and latitude coordinates of the vehicle, as well as a time stamp and a date stamp. In-vehicle phone 134 is an analog, digital, dual-mode, dual-band, multi-mode or multi-band cellular phone.

Telematics unit 120 can store a processed speech input stream, GPS location data, and other data files in in-vehicle memory 128. Telematics unit 120 can set or reset calling-state indicators and can enable or disable various cellular-phone functions, telematics-unit functions and vehicle functions when directed by program code running on DSP 122. Telematics unit 120 can send and receive over-the-air messages using, for example, a pseudo-standard air-interface function or other proprietary and non-proprietary communication links.

DSP 122 executes various computer programs and computer program code, within telematics unit 120, which control programming and operational modes of electronic and mechanical systems. DSP 122 controls communications between telematics unit 120, wireless carrier system 140 or satellite carrier system 141 and call center 180. A speech-recognition engine 119, which can translate human speech input through microphone 130 to digital signals used to control functions of telematics unit, is installed in telematics unit 120. The interface to telematics unit 120 includes one or more buttons (not shown) on telematics unit 120, on multimedia system 118, or on an associated keyboard or keypad that are also used to control functions of telematics unit. A text to speech synthesizer 121 can convert text strings to audible messages that are played through speaker 132 of telematics unit 120 or through speakers 117 of multimedia system 118.

Speech recognition engine 119 and buttons are used to activate and control various functions of telematics unit 120. For example, programming of in-vehicle phone 134 is controlled with verbal commands that are translated by speech-recognition software executed by DSP 122. Alternatively, pushing buttons on interface of telematics unit 120 or on in-vehicle phone 134 is used to program in-vehicle phone 134. In another embodiment, the interface to telematics unit 120 includes other forms of preference and data entry including touch-screens, wired or wireless keypad remotes, or other wirelessly connected devices such as Bluetooth-enabled devices or 802.11-enabled devices.

In one embodiment of the current invention, speech recognition engine 119 comprises a configurable listener automaton 111 that receives a speech input stream and processes the speech input stream according to a set of rules and structures defined in a domain specific actuator. The listener automaton 111 writes the processed speech input stream to an activation cache that is a portion of in-vehicle memory 128. DSP 122 executes computer program code comprising a context recognizer and associated domain specific actuators, within telematics unit 120, which control operation and configuration of the listener automaton 111. DSP 122 controls communications between telematics unit 120, listener automaton 111, and activation cache in in-vehicle memory 128. Data in the activation cache is supplied to the vehicle devices 115 through vehicle bus 112.

DSP 122 controls, generates and accepts digital signals transmitted between telematics unit 120 and a vehicle communication bus 112 that is connected to various vehicle components 114, vehicle devices 115, various sensors 116, and multimedia system 118 in mobile vehicle 110. DSP 122 can activate various programming and operation modes, as well as provide for data transfers. In facilitating interactions among the various communication and electronic modules, vehicle communication bus 112 utilizes bus interfaces such as controller-area network (CAN), J1850, International Organization for Standardization (ISO) Standard 9141, ISO Standard 11898 for high-speed applications, and ISO Standard 11519 for lower speed applications.

Mobile vehicle 110 via telematics unit 120 sends and receives radio transmissions from wireless carrier system 140, or satellite carrier system 141. Wireless carrier system 140, or satellite carrier system 141 is any suitable system for transmitting a signal from mobile vehicle 110 to communication network 142.

Communication network 142 includes services from mobile telephone switching offices, wireless networks, public-switched telephone networks (PSTN), and Internet protocol (IP) networks. Communication network 142 comprises a wired network, an optical network, a fiber network, another wireless network, or any combination thereof. Communication network 142 connects to mobile vehicle 110 via wireless carrier system 140, or satellite carrier system 141.

Communication network 142 can send and receive short messages according to established protocols such as dedicated short range communication standard (DSRC), IS-637 standards for short message service (SMS), IS-136 air-interface standards for SMS, and GSM 03.40 and 09.02 standards. In one embodiment of the invention, similar to paging, an SMS communication is posted along with an intended recipient, such as a communication device in mobile vehicle 110.

Call center 180 is a location where many calls are received and serviced at the same time, or where many calls are sent at the same time. In one embodiment of the invention, the call center is a telematics call center, facilitating communications to and from telematics unit 120 in mobile vehicle 110. In another embodiment, the call center 180 is a voice call center, providing verbal communications between a communication service advisor 185, in call center 180 and a subscriber. In another embodiment, call center 180 contains each of these functions.

Communication services advisor 185 is a real advisor or a virtual advisor. A real advisor is a human being in verbal communication with a user or subscriber. A virtual advisor is a synthesized speech interface responding to requests from user or subscriber. In one embodiment, the virtual advisor includes one or more recorded messages. In another embodiment, the virtual advisor generates speech messages using a call center based text to speech synthesizer (TTS). In another embodiment, the virtual advisor includes both recorded and TTS generated messages.

Call center 180 provides services to telematics unit 120. Communication services advisor 185 provides one of a number of support services to a subscriber. Call center 180 can transmit and receive data via a data signal to telematics unit 120 in mobile vehicle 110 through wireless carrier system 140, satellite carrier systems 141, or communication network 142.

Call center 180 can determine mobile identification numbers (MINs) and telematics unit identifiers associated with a telematics unit access request, compare MINs and telematics unit identifiers with a database of identifier records, and send calling-state messages to the telematics unit 120 based on the request and identification numbers.

Communication network 142 connects wireless carrier system 140 or satellite carrier system 141 to a user computer 150, a wireless or wired phone 160, a handheld device 170, such as a personal digital assistant, and call center 180. User computer 150 or handheld device 170 has a wireless modem to send data through wireless carrier system 140, or satellite carrier system 141, which connects to communication network 142. In another embodiment, user computer 150 or handheld device 170 has a wired modem that connects to communications network 142. Data is received at call center 180. Call center 180 has any suitable hardware and software capable of providing web services to help transmit messages and data signals from user computer 150 or handheld device 170 to telematics unit 120 in mobile vehicle 110.

Figure 2:
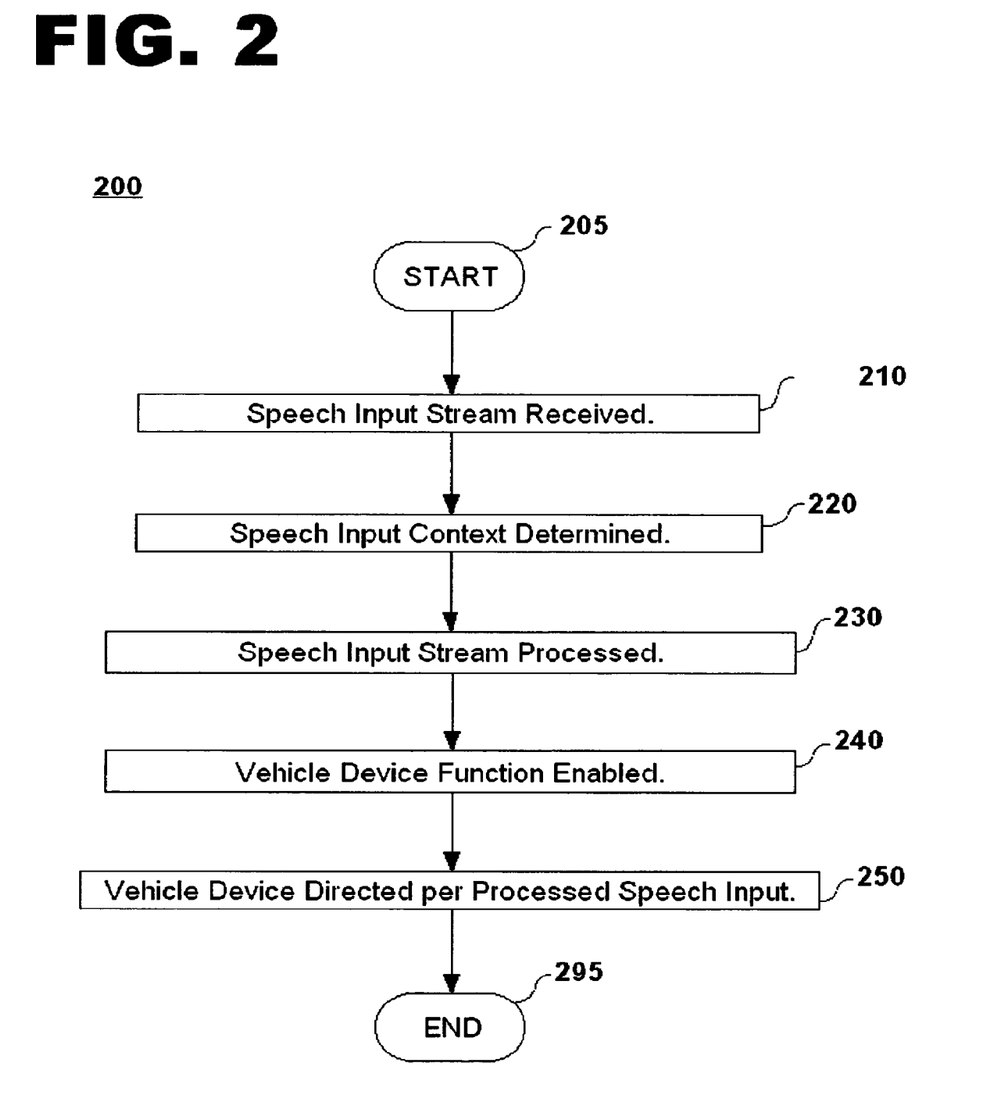
FIG. 2 is a flow diagram of a method for enabling a device function of a vehicle in accordance with one embodiment of the current invention.

FIG. 2 is a flow diagram of a method for enabling a device function of a vehicle in accordance with one embodiment of the current invention at 200. The method enabling a device function of a vehicle at 200 begins (block 205) when a speech-input stream is received at a telematics unit from a speech source (block 210). The speech source can be human speech or speech generated by a speech synthesizer. A speech input context is determined for the received speech input stream (block 220). The speech input context identifies the framework in which to interpret the received speech input stream. The speech input context associates the speech input stream to a specific device function of the vehicle such as navigation or personal calling.

The received speech input is processed based on the determined speech input context (block 230). The device function of the vehicle is enabled responsive to the processed speech input stream (block 240). The vehicle device in control of the enabled device function of the vehicle is directed based on the processed speech input stream (block 250). An example of a vehicle device is the navigation system of the vehicle and the corresponding device function of the vehicle is navigation. The method ends (block 295).

Figure 3:
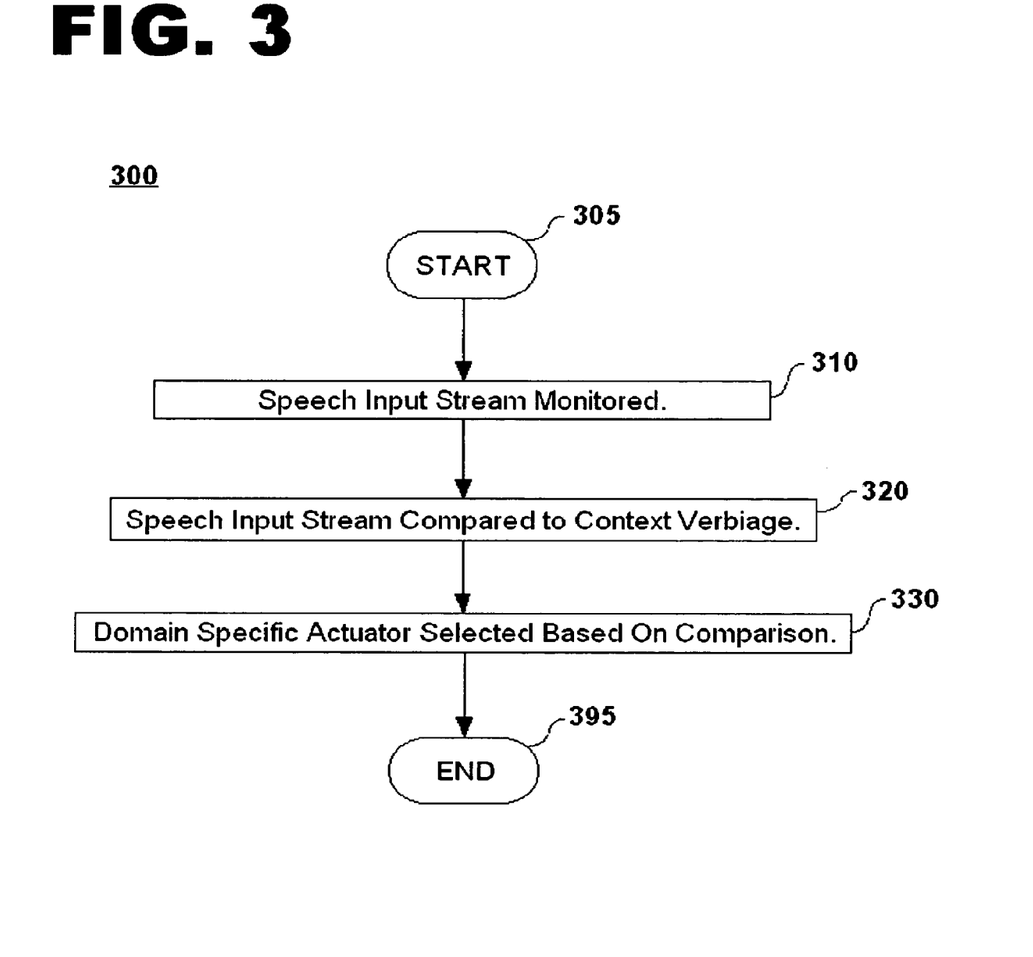
FIG. 3 is a flow diagram detailing the step of determining the speech input context at block 220 of FIG. 2.

FIG. 3 is a flow diagram detailing the step of determining the speech input context at block 220 of FIG. 2. The step of determining the speech input context at 300 begins (block 305) with monitoring the speech input stream at a context recognizer (block 310). The context recognizer comprises a context verbiage. The speech input stream is compared to the context verbiage (block 320). An example of verbiage contained in the context recognizer is the word "street" preceded by a text string. This verbiage is use to identify an address as a component of the speech input stream.

In one embodiment, a speech input stream comprised of numerical utterances followed by non-numerical utterances is associated with a navigation destination address context. In another embodiment, a speech input stream comprised of numerical utterances is associated with a directory assistance context.

Each device function of the vehicle is assigned a domain specific actuator. The domain specific actuator contains a set of rules and structures that determine how to format the speech input stream for the corresponding vehicle device that controls the particular device function of the vehicle. One of a plurality of domain specific actuators is selected based on the comparison of the speech input stream to the context verbiage (block 330) and the step ends (block 395).

In one example of the system and method for enabling a device function of a vehicle, a subscriber contacts directory assistance to obtain a phone number for a business. The directory assistance operator speaks the phone number for the business. The spoken phone number is the speech input stream in this example. The context recognizer identifies the string of numbers as a phone number by matching the received phone number to context verbiage corresponding to a phone number string. The context recognizer having determined that a phone number is being received selects a domain specific actuator for personal calling. The speech input stream is then formatted so that the phone number is available for use by the subscriber's in-vehicle phone or personal phonebook. The phone number is written to the activation cache and the personal calling device function is thereby enabled with the phone number data.

In another example, following on the previous example, the subscriber's personal calling is directed to request what action the subscriber would like to take regarding the received phone number. The personal calling device sends the subscriber a prompt asking the subscriber if they wish to dial or to store the phone number.

Figure 4:
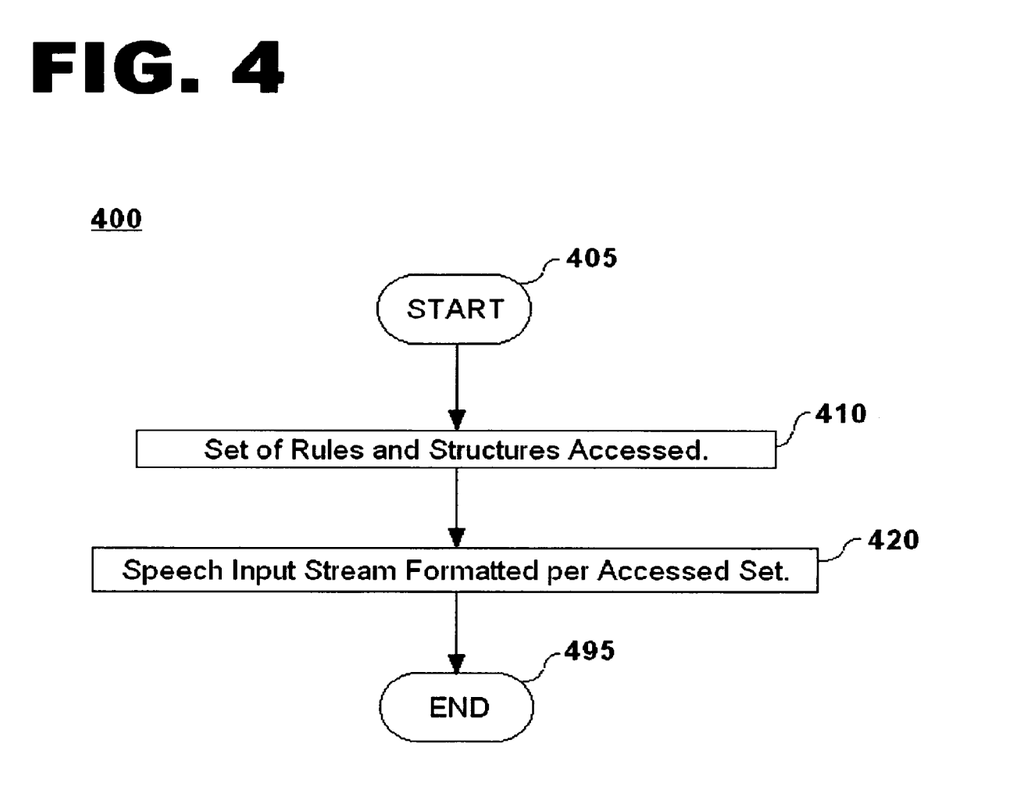
FIG. 4 is a flow diagram detailing the step of processing the received speech input stream at block 230 of FIG. 2.

FIG. 4 is a flow diagram detailing the step of processing the received speech input stream at block 230 of FIG. 2. The step of processing the received speech input stream at 400 begins (block 405) by accessing a set of rules and structures for formatting the speech input stream according the determined speech input context (block 410). The set of rules and structures are contained in the domain specific actuator. The received speech input stream is formatted based on the set of rules and structures (block 420). For example, if the speech input stream includes a phone number, the speech input stream is formatted so that the phone number and other relevant data, such as the entity associated with the phone number, is available to and in the proper format for personal calling. The step ends (block 495).

Figure 5:
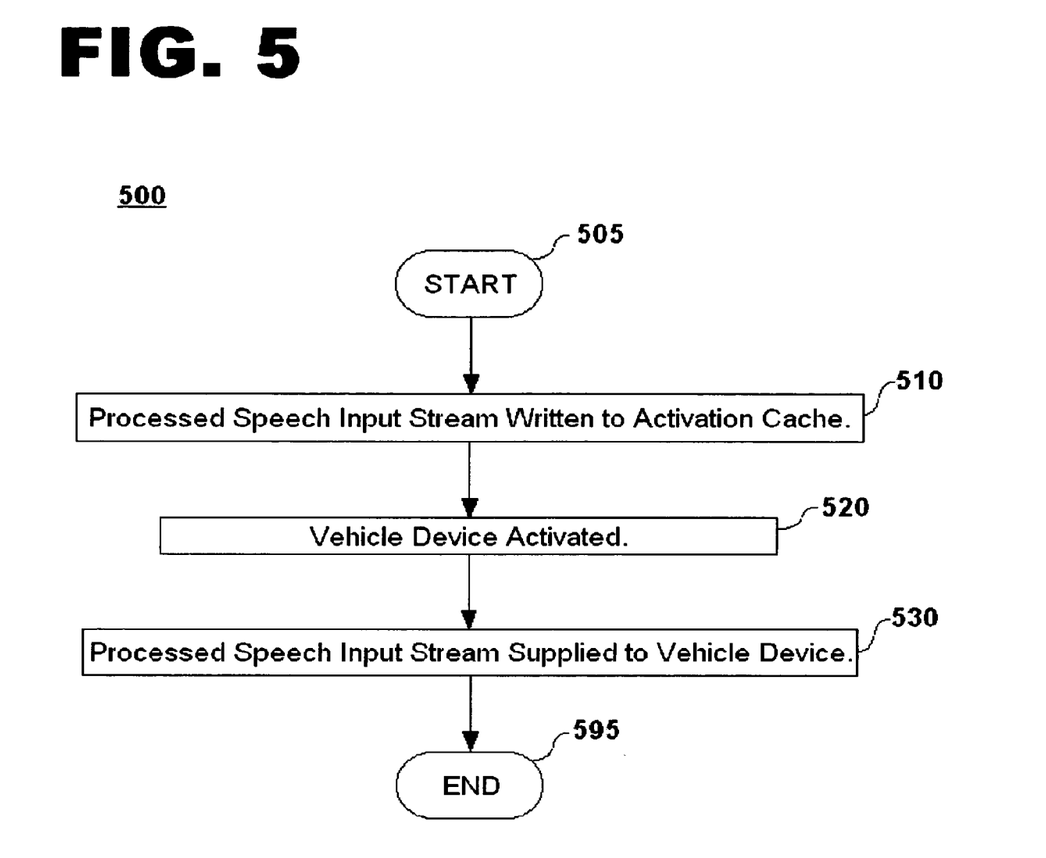
FIG. 5 is a flow diagram detailing the step enabling the device function of the vehicle at block 240 of FIG. 2.

FIG. 5 is a flow diagram detailing the step enabling the device function of the vehicle at block 240 of FIG. 2. The step of enabling the device function of the vehicle at 500 begins (block 505) with writing the processed speech input stream in an activation cache (block 510). The activation cache is a memory location where a vehicle device can access the processed speech input stream. The vehicle device corresponding to the enabled device function of the vehicle is activated (block 520). The processed speech input stream from the activation cache is supplied to the vehicle device (block 530) and the step ends (block 595). In the example where the device function of the vehicle is personal calling the vehicle device corresponding to personal calling is the in-vehicle phone. A phone number processed from the speech input stream and written to the activation cache would be supplied to the in-vehicle phone for dialing or storing.

While embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of obtaining information from speech at a vehicle, comprising:
   (a) receiving at a telematics unit in a vehicle a first speech input spoken by an occupant of the vehicle;
   (b) determining if telephone-related information has been requested based on the inclusion of numerical utterances in the first speech input;

(c) determining if navigation information has been requested based on the inclusion of numerical utterances followed by non-numerical utterances in the first speech input;
(d) enabling a navigation system of the vehicle based on the determination in step (c);
(e) contacting directory assistance in response to the determination in step (b);
  (i) receiving at the telematics unit telephone-related information in the form of a second speech input sent to the vehicle from a remote facility via a wireless carrier system;
  (ii) obtaining data from the telephone-related information by performing speech recognition on the second speech input;
  (iii) querying the vehicle occupant based on the obtained data; and
  (iv) sending the obtained data to a vehicle device based on the query.

2. The method of claim 1, further comprising carrying out a vehicle function related to the obtained data.

3. The method of claim 1, wherein step (g) further comprises converting the data into a form usable by the vehicle device.

4. The method of claim 1, further comprising the step of storing the second speech input at the vehicle.

5. The method of claim 1, wherein step (e) further comprises recognizing the data from the second speech input using a selected domain specific actuator.

6. A method of obtaining information from speech at a vehicle, comprising:
   (a) receiving speech from a vehicle occupant at a vehicle;
   (b) identifying one or more words in the received speech;
   (c) analyzing the received speech for requests for telephone-related information based on the inclusion of numerical utterances in the received speech and requests for navigation information based on the inclusion of numerical utterances followed by non-numerical utterances; and
   (d) when received speech includes the request for telephone related information or the request for navigation information, then carrying out the following steps at the vehicle:
     (i) enabling a navigation system of the vehicle when a request for navigation information exists;
     (ii) monitoring speech received by the vehicle over a wireless carrier system when a request for telephone-related information exists;
       (1) identifying the telephone-related information in the monitored speech; and
       (2) storing at least part of the telephone-related information at the vehicle.

7. The method of claim 6, further comprising the step of activating a vehicle device based on the inclusion of the request in step (d).

8. The method of claim 7, wherein the activating step further comprises enabling a vehicle function related to the requested information.

9. The method of claim 6, wherein at least part of the requested navigation information in step (d) is an address.

10. The method of claim 6, wherein step (iv) converts data into a form usable by the vehicle device.

11. A method of obtaining information from speech at a vehicle, comprising:
    (a) receiving from an occupant of a vehicle a spoken request at a vehicle;
    (b) identifying navigational assistance in the spoken request based on the inclusion of numerical utterances followed by non-numerical utterances;
    (c) identifying telephone-related assistance in the spoken request based on only inclusion of numerical utterances;
    (d) identifying a vehicle function associated with the requested navigational assistance or telephone-related assistance;
    (e) enabling a navigation system of the vehicle when a request for navigation assistance exists;
    (f) wirelessly transmitting the request from the vehicle when identifying telephone-related assistance;
      (i) receiving a response to the request for telephone-related assistance from a directory assistance provider;
      (ii) performing speech recognition on the response;
      (iii) automatically selecting from the recognized speech at least a part of the telephone-related assistance that is usable by a vehicle device to carry out the vehicle function;
      (iv) putting the selected telephone--related assistance into a form usable by the vehicle device to carry out the vehicle function; and
      (v) carrying out the vehicle function using the vehicle device and selected telephone-related assistance.

12. The method of claim 11, wherein the obtained navigational assistance is an address or telephone number.

13. The method of claim 11, wherein step (b) further comprises detecting a predefined keyword uttered by a vehicle occupant.

14. The method of claim 11, wherein step (f) further comprises converting the part of the navigational assistance into a form usable by the vehicle device.

* * * * *